(12) United States Patent
Hatwar et al.

(10) Patent No.: US 12,326,583 B2
(45) Date of Patent: Jun. 10, 2025

(54) METHODS OF MANUFACTURING MIRRORS

(71) Applicant: Eagle Technology, LLC, Melbourne, FL (US)

(72) Inventors: Tukaram Hatwar, Penfield, NY (US); Rebecca Borrelli, Rochester, NY (US); Stephen Oliver, Webster, NY (US); James T. Mooney, Rochester, NY (US)

(73) Assignee: Eagle Technology, LLC, Melbourne, FL (US)

( * ) Notice: Subject to any disclaimer, the term of this patent is extended or adjusted under 35 U.S.C. 154(b) by 403 days.

(21) Appl. No.: 17/733,588

(22) Filed: Apr. 29, 2022

(65) Prior Publication Data

US 2023/0350109 A1   Nov. 2, 2023

(51) Int. Cl.
| | | |
|---|---|---|
| *G02B 5/08* | (2006.01) | |
| *B28B 1/00* | (2006.01) | |
| *B29C 64/106* | (2017.01) | |
| *B33Y 10/00* | (2015.01) | |
| *B33Y 80/00* | (2015.01) | |
| *B29D 11/00* | (2006.01) | |
| *B29K 709/02* | (2006.01) | |
| *B29L 11/00* | (2006.01) | |

(52) U.S. Cl.
CPC ............ *G02B 5/0816* (2013.01); *B28B 1/001* (2013.01); *B29C 64/106* (2017.08); *B33Y 10/00* (2014.12); *B33Y 80/00* (2014.12); *B29D 11/00596* (2013.01); *B29K 2709/02* (2013.01); *B29K 2995/0012* (2013.01); *B29L 2011/0058* (2013.01)

(58) Field of Classification Search
CPC ...... G02B 5/0816; B33Y 10/00; B33Y 80/00; B29C 64/106; B28B 1/001; B29D 11/00596; B29K 2709/02; B29K 2995/0012; B29L 2011/0058
See application file for complete search history.

(56) References Cited

U.S. PATENT DOCUMENTS

| | | | | |
|---|---|---|---|---|
| 4,315,991 A | | 2/1982 | Hagy et al. | |
| 6,001,181 A | * | 12/1999 | Bullen | B05C 5/0216 |
| | | | | 118/679 |

(Continued)

OTHER PUBLICATIONS

Gerhard Kalkowski, et al., "Silicate and direct bonding of low thermal expansion materials", Material Technologies and Applications to Optics, Structures, Components, and Sub-Systems. vol. 8837. SPIE, 2013, 11 pages.

(Continued)

*Primary Examiner* — Andrew L Swanson
(74) *Attorney, Agent, or Firm* — Edell, Shapiro & Finnan, LLC

(57) ABSTRACT

Methods of forming a mirror by bonding a faceplate to a core structure using adhesive formulations that include fused silica particles having diameters that range between 1 to 60 micrometers with an average diameter of the silica particles being between 8 to 10 micrometers. The adhesive formulation further includes an activator including 25 to 50 weight % sodium silicate, 25 to 50 weight % sodium hydroxide and a liquid. The fused silica particles constitute 70 to 80 weight % of the adhesive formulation and the activator constitute 20 to 30 weight % of the adhesive formulation.

20 Claims, 6 Drawing Sheets

(56) References Cited

U.S. PATENT DOCUMENTS

| | | | | |
|---|---|---|---|---|
| 6,548,176 B1* | 4/2003 | Gwo | ............................ | C09J 5/00 |
| | | | | 206/568 |
| 7,678,458 B2 | 3/2010 | Lipson et al. | | |
| 8,291,728 B2 | 10/2012 | Carberry et al. | | |
| 2002/0144771 A1* | 10/2002 | Kuczynski | ................. | C09J 5/00 |
| | | | | 156/329 |
| 2018/0003867 A1* | 1/2018 | Mooney | ................. | G02B 7/183 |

OTHER PUBLICATIONS

Alexander Iles, et al., "Bonding of soda-lime glass microchips at low temperature", Microfluid Nanofluid (2007) 3: 119-122, DOI 10.1007/s10404-006-0101-z, 4 pages.

Paul V. Mammini, "A bonded precision opptical assembly using potassium hydroxide", Optical Materials and Structures Technologies IV. vol. 7425. SPIE, 2009, 10 pages.

H. Nakanishi, et al., "Studies on SiO2 Bonding With Hydrofluoric Acid. Room Temperature and Low Stress Bonding Technique for MEMS", Sensors and Actuators A: Physical 79.3 (2000): 237-244., 7 pages.

J. van Elp, et al., "Anodic bonding using the low expansion glass ceramic Zerodur®", J. Vac. Sci. Technol. B 23(1), Jan. 5, 2005, 4 pages.

Dz-Hung Gwo, "Ultra-precision bonding for cryogenic fused-silica optics", SPIE Conference on Cryogenic Optical Systems and Instruments VIII, San Diego, CA, Jul. 1998, SPIE vol. 3435, 8 pages.

Katie Green, et al., "Chemical bonding for precision optical assemblies", Optical Engineering 50(2), 023401 (Feb. 2011), 12 pages.

Mary T. Strzelecki, et al., "Low Temperature Bonding of Light-weighted Mirrors", Optical Materials and Structures Technologies, Dec. 12, 2003, doi: 10.1117/12.506018, 7 pages.

Jennifer Miller, et al., "Ultra lightweight low temperature fused Zerodur mirror", Proc. SPIE 2536, Optical Manufacturing and Testing, Sep. 8, 1995, doi: 10.1117/12.218447, 6 pages.

J. Spangenberg-Jolley, et al., "Mirror substrate fabrication techniques of low expansion glasses", SPIE vol. 1013 Optical Design Methods, Applications, and Large Optics (1988), 8 pages.

* cited by examiner

METHODS OF MANUFACTURING MIRRORS

TECHNICAL FIELD

The present invention relates to methods of manufacturing mirrors used in imaging applications.

BACKGROUND

Lightweight mirrors used in space-based imaging typically comprise a lightweight core having a front side onto which a light reflective faceplate is secured by the use of an adhesive. The core and faceplate are typically made of low CTE (coefficient of thermal expansion) materials. Some adhesives on the market today have one or more of the following: (1) limited CTE matching capability (can only be used with very limited types of materials), (2) a short working life (particularly for larger mirror assemblies), (3) incompatible for use with porous 3D printed cores, (4) high viscosity (difficult to dispense through a small extrusion nozzle) and (5) high cure temperature (which excludes use with some highly desirable core materials such as Zerodur® which is manufactured by Schott AG, Clearceram™ which is manufactured by Ohara, and cordierite). Although thermal and ultra-violate cure epoxies cure at low temperatures, they have high moisture absorption and a high CTE that make them unsuitable for high precision, lightweight mirror applications.

SUMMARY

Disclosed herein are methods of manufacturing mirrors that entail the use of adhesives that overcome one or more of the problems discussed above. For example, the adhesive formulations disclosed herein have a low CTE (<0.5 ppm/° C., preferably 0.1-0.35 ppm/° C.) and enable bonding between parts of a mirror, or other optical surfaces, at relatively low temperatures (100 to 400° C.), while providing a good bond strength (3000-6000 psi). The low CTE attribute allows for the bonding together of cores and faceplates that each have a CTE on the order of 0.5 ppm/° C. or less. The low cure temperature feature makes the adhesives compatible with cores made of materials that cannot withstand extremely high temperatures, such as Zerodur®, Clearceram™ and cordierite. Zerodur®, for example, cannot withstand temperatures exceeding 250° C. The adhesives disclosed herein are also highly resistant to moisture absorption and are stable at room temperature for a matter of days and not hours.

According to some implementations a bonding the faceplate to the core structure is achieved through the use of first adhesive formulations that include: (1) fused silica particles having diameters that range between 1 to 60 micrometers, an average diameter of the silica particles being between 8 to 10 micrometers, the fused silica particles constituting 70 to 80 weight % of the adhesive formulation; and (2) an activator including 25 to 50 weight % sodium silicate, 25 to 50 weight % sodium hydroxide and a liquid, the activator constituting 20 to 30 weight % of the adhesive formulation. These first adhesive formulations advantageously have a low curing temperature in the range of 100 to 250° C., a CTE of less than 0.5 ppm/° C. (preferably ranging between 0.1 to 0.3 ppm/° C.) and a viscosity sufficiently low for being extruded through a 0.026 to 0.063 inch nozzle. Hereinafter, the first adhesive formulations are sometimes referred to as "adhesive I formulations".

According to some implementations a bonding the faceplate to the core structure is achieved through the use of second adhesive formulations that include: (1) a binder comprising 40 to 60 weight % monoaluminum phosphate and 40 to 60 weight % water, the binder constituting 25 to 35 weight % of the adhesive formulation: and (2) a composition that includes a first set of particles having a coefficient of thermal expansion equal to or less than 0.05 ppm/° C. and diameters between 1 to 60 micrometers and a second set of particles having a coefficient of thermal expansion equal to or less than 0.05 ppm/° C. and diameters between 0.05 to 1 micrometers, the first set of particles constituting 80 to 85 weight % of the composition, the second set of particles constituting 15 to 20 weight % of the composition; the composition constituting 65 to 75 weigh % of the adhesive formulation. These second adhesive formulations advantageously have a low curing temperature in the range of 100 to 400° C., a CTE of less than 0.5 ppm/° C. (preferably ranging between 0.1 to 0.3 ppm/° C.) and a viscosity sufficiently low for being extruded through a 0.026 to 0.063 inch nozzle. Hereinafter, the second adhesive formulations are sometimes referred to as "adhesive II formulations".

In regard to each of the first and second adhesive formulations, according to some implementations the core is formed using a 3D printing process and the adhesive is applied to the core through a nozzle that is a part of the 3D printing machine. According to some implementations, the core is produced using a 3D printing machine and the bonding of the faceplate to the front side of the core includes extruding the adhesive through a nozzle of the 3D printing machine onto one or both of the front face of the core and the backside of the faceplate.

According to some implementation a back plate is bonded to a backside of the core using any one of the first and second adhesive formulations for the purpose of increasing the rigidity/stiffness of the mirror assembly.

These and other advantages and features will become evident in view of the drawings and detailed description.

DETAILED DESCRIPTION

In the description that follows, methods of manufacturing mirrors are disclosed. The disclosure is primarily directed to manufacturing lightweight mirrors with parts having very low coefficients of thermal expansion that are bonded together with adhesives also having very low coefficients of thermal expansion and low cure temperatures. It is appreciated and understood that other processing steps may be integrated into the manufacturing methods disclosed herein in order to achieve desired mirror characteristics.

Figure 1:
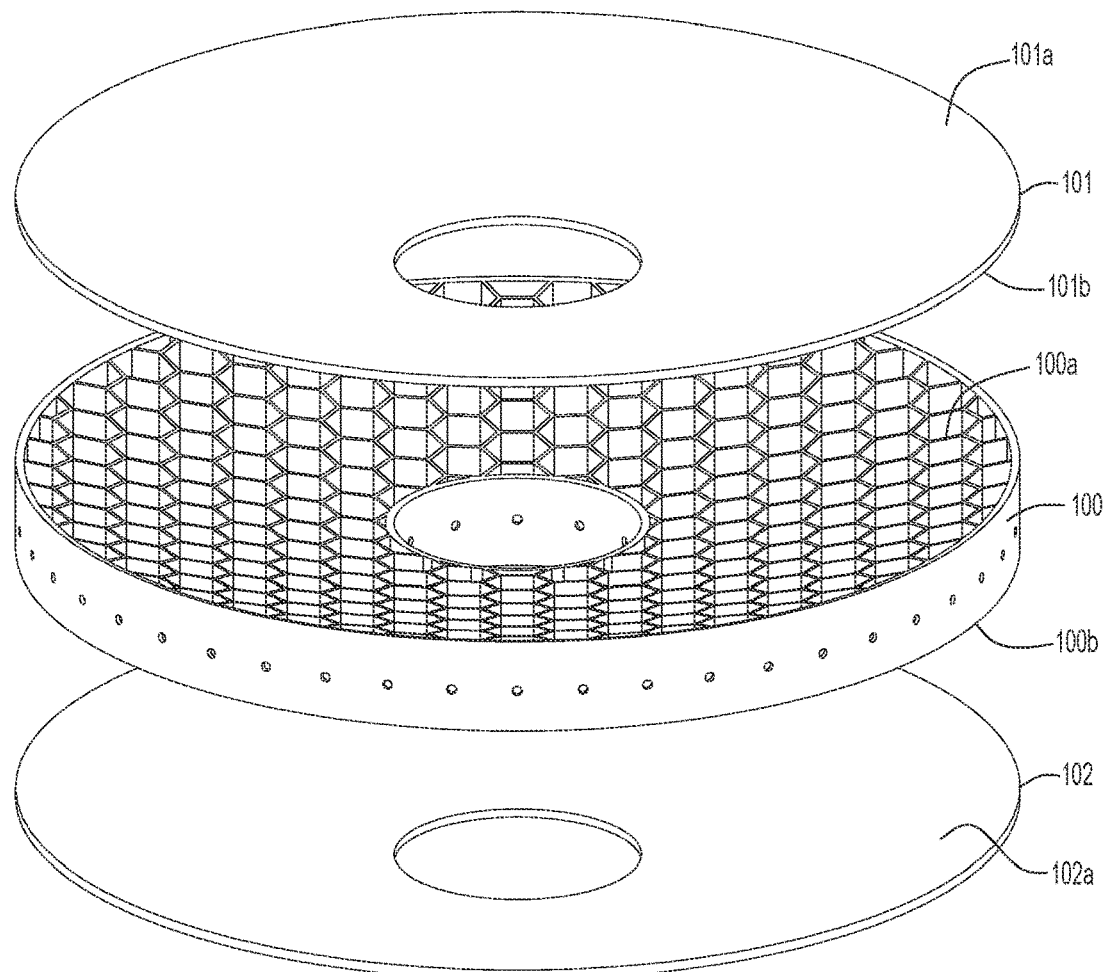
FIG. 1 illustrates a core, faceplate and back plate of a mirror assembly prior to the faceplate and back plate being bonded to the core.
Figure 2:
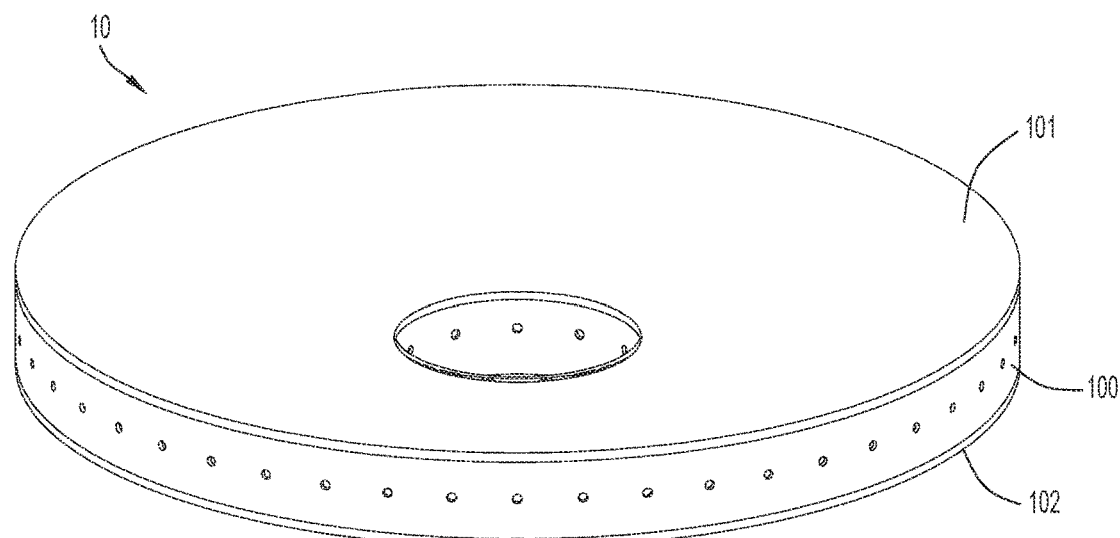
FIG. 2 illustrates the core, faceplate and back plate of FIG. 1 in an assembled state with the faceplate and back plate being adhesively bonded to the core.

FIG. 1 illustrates the main parts that go into a making of the mirror. These main parts include a core structure 100 and a faceplate 101 that is bonded to the core structure as shown in FIG. 2. The faceplate 101 includes a light reflecting surface on a front side 101a thereof and the backside 101b of the faceplate 101 is configured for being adhesively bonded to the front side 100a of the core structure 100. According to some implementations, the mirror may additionally include a back plate 102 having a front side 102a that is adhesively bonded to the backside 100b of the core 100. A bonding of a back plate to the core structure is for the purpose of enhancing the rigidity/stiffness of the mirror assembly.

According to one implementation a mirror 10 is made by obtaining a core structure made of a material that has a CTE equal to or less than 0.5 ppm/° C. The material may comprise, for example, a ceramic such as Clearceram™. a lithium-aluminosilicate ceramic such as Zerodur®, a MgO, $Al_2O_3$ and $SiO_2$ composite such as cordierite or titania silicate. The titania silicate may comprise the ultra-low expansion glass sold by Corning under the tradename ULE® Glass. According to some implementations the core structure 100 is manufactured by 3D printing a ceramic material using stereolithography techniques.

The process further includes obtaining a faceplate that is made of a material having a CTE of less than 0.5 ppm/° C. According to some implementations the faceplate 101 is made of a titania silicate glass such as ultra-low expansion glass sold by Corning under the tradename ULE® Glass. As explained above, the faceplate 101 is constructed to have a front side 101a on which a reflective film is deposited.

Upon obtaining each of the core structure 100 and faceplate 101, the faceplate is bonded to the core structure using an adhesive formulation that includes fused silica particles and an activator. The fused silica particles have diameters that range between 1 to 60 micrometers with an average diameter of the silica particles being between 8 to 10 micrometers. The fused silica particles constitute 70 to 80 weight % of the adhesive formulation. The activator includes 25 to 50 weight % sodium silicate, 25 to 50 weight % sodium hydroxide and a liquid. The activator constitutes 20 to 30 weight % of the adhesive formulation. The immediately preceding adhesive formulation is referred to herein as the "adhesive I formulation". According to some implementations the adhesive is formulated to have a CTE in a range between 0.1 to 0.3 ppm/° C.

According to some implementations, the bonding is accomplished by administering the adhesive I formulation onto one or both of the front side 100a of the core structure 100 and the backside 101b of the faceplate 101. According to some implementations the administering of the adhesive I formulation is achieved by extruding the adhesive through a nozzle, preferably a 0.026 to 0.063 inch nozzle. According to some implementations the nozzle comprises a part of a 3D printing machine.

Figure 3:
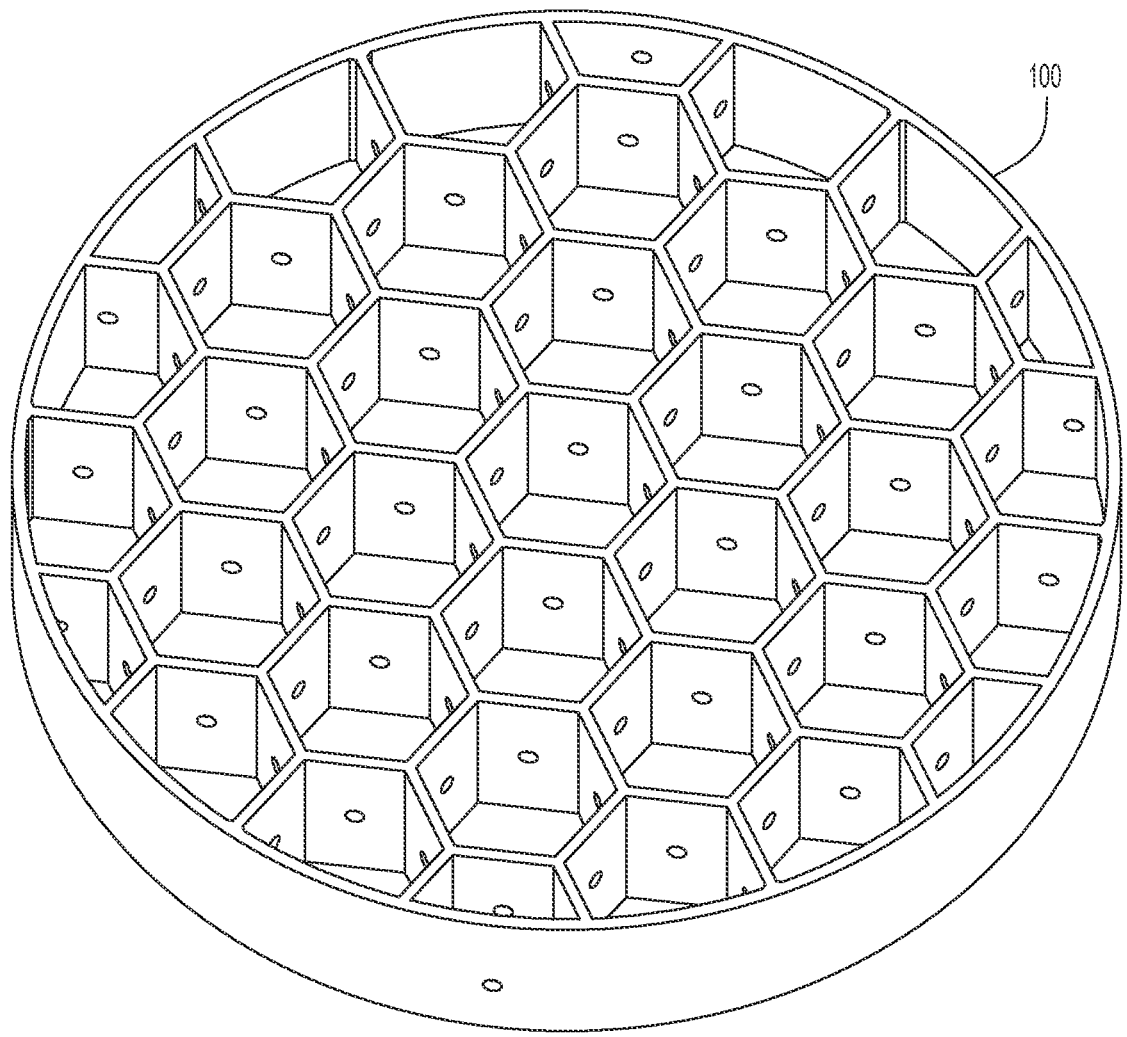
FIG. 3 illustrates a structure of a core according to one implementation.

As noted above, in some instances the core structure 100 is manufactured using a 3D printing machine. This involves extruding a low CTE material through a nozzle to build the core structure layer by layer. According to some implementations, the nozzle used to administer the adhesive I formulation is a part of the same 3D printing machine used to construct the core, and is in some instances the same nozzle through which the low CTE material is extruded. FIG. 3 illustrates a core 100 having a honeycomb structure made using a 3D process.

After having administered the adhesive I formulation onto one or both of the core structure 100 and faceplate 101, according to some implementations the adhesive I formulation is cured at a temperature in the range of 100 to 250° C., and preferably between a temperature in the range of 120 to 160° C. According to some implementations the curing is carried out in a range of 4 to 8 hours. In some instances, a drying out of the adhesive I formulation at room temperature is carried out before the step of curing the adhesive. According to some implementations the drying out is carried out for at least 0.5 hours.

According some implementations, the faceplate 101 having a CTE equal to or less than 0.5 ppm/° C. is bonded to the core structure 100 having a CTE equal to or less than 0.5 ppm/° C. using other adhesive formulations that include: (1) a binder comprising 40 to 60 weight % monoaluminum phosphate and 40 to 60 weight % water, the binder constituting 25 to 35 weight % of the adhesive formulation and, (2) a composition that includes a first set of particles having a coefficient of thermal expansion equal to or less than 0.05 ppm/° C. and diameters between 1 to 60 micrometers and a second set of particles having a coefficient of thermal expansion equal to or less than 0.05 ppm/° C. and diameters between 0.05 to 1 micrometers, the first set of particles constituting 80 to 85 weight % of the composition, the second set of particles constituting 15 to 20 weight % of the composition; the composition constituting 65 to 75 weigh % of the adhesive formulation. The immediately preceding adhesive formulation is referred to herein as the "adhesive II formulation". According to some implementations the adhesive is formulated to have a CTE in a range between 0.1 to 0.3 ppm/° C.

The material of which the core structure 100 is made may comprise, for example, a ceramic such as Clearceram™. a lithium-aluminosilicate ceramic such as Zerodur®, a MgO, $Al_2O_3$ and $SiO_2$ composite such as cordierite or titania silicate. In addition, according to some implementations the faceplate 101 may also be made of a titania silicate glass. The titania silicate may comprise the ultra-low expansion glass sold by Corning under the tradename ULE® Glass.

According to some implementations, each of the first and second set of particles of the adhesive II formulations comprise glass particles. The glass particles may comprise titania silicate such as ultra-low expansion glass manufactured by Corning and sold under the tradename ULE® Glass.

According to some implementations, the first set of particles has a D50 density in a range of 15 to 20 micrometers and the second set of particles has a D50 density in a range of 0.3 to 0.4 micrometers. Particle size distribution D50 is also known as median diameter or medium value of particle size distribution. D50 is the value of the particle diameter at 50% in the cumulative distribution. For example, if D50=15 micrometers, then 50% of the particles in the sample are larger than 15 micrometers, and 50% of the particles in the sample are smaller than 15 micrometers.

After having administered the adhesive II formulation onto one or both of the core structure 100 and faceplate 101, according to some implementations the adhesive II formulation is cured at a temperature no greater than 400° C., and preferably between a temperature in the range of 100 to 375° C. According to some implementations the curing is carried out in a range of 4 to 6 hours. According to some implementations, the curing is carried out at 75 to 125° C. for 1.5 to 2.5 hours, and then at 235 to 285° C. for 1.5 to 2.5 hours, and then at 350 to 400° C. for 0.5 to 1.5 hours.

According to some implementations the administering of the adhesive II formulation onto the surfaces of the core structure and faceplate is achieved by extruding the adhesive through a nozzle, preferably a 0.026 to 0.063 inch nozzle. According to some implementations the nozzle comprises a part of a 3D printing machine.

In some instances the core structure 100 is manufactured using a 3D printing machine. This involves extruding a low CTE material through a nozzle to build the core structure layer by layer. According to some implementations, the nozzle used to administer the adhesive II formulation is a part of the same 3D printing machine used to construct the core, and is in some instances the same nozzle through which the low CTE material is extruded.

As mentioned above, in some instances a back plate 102 may be fixed to the backside 100b of the core structure 100 for the purpose of enhancing the stiffness/rigidity of the mirror assembly 10. According to some implementations the back plate 102 is made of the same material as the face plate 101. The material may comprise, for example, the ultra-low expansion glass sold by Corning under the tradename ULE® Glass.

The bonding of the back plate 102 to the core structure 100 typically comprises similar processes employed in the bonding of the faceplate 101 to the core structure 100 using any one of the adhesive I formulations or adhesive II formulations. According to some implementations, the back plate 102 is bonded to the core structure 102 prior to the faceplate 101 being bonded to the core structure.

FIGS. 4-7 are flowcharts of various methods of producing a mirror as disclosed above.

Figure 4:
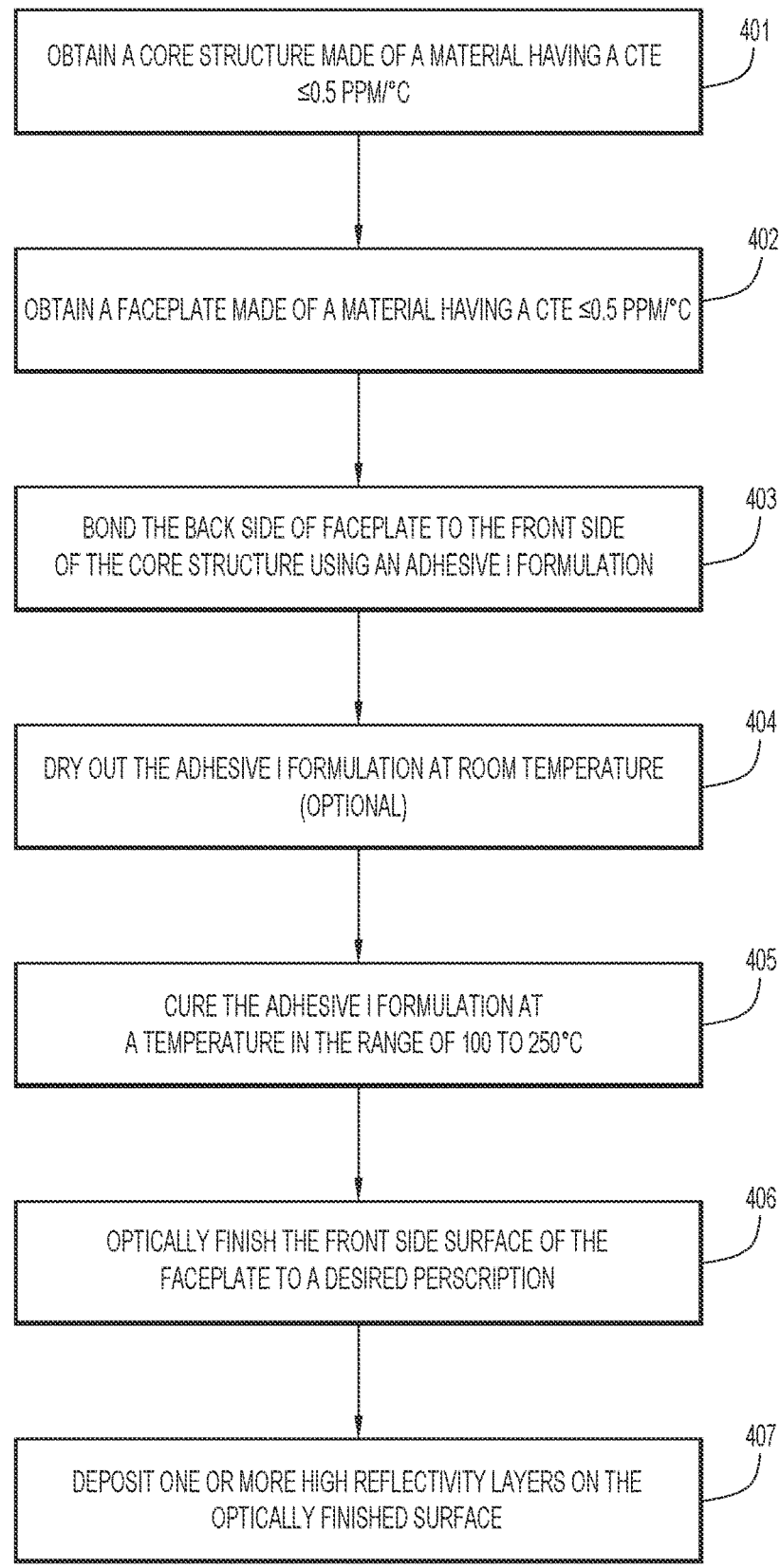
FIG. 4 is a flow chart of a method of producing a mirror according to one implementation.

In the method of FIG. 4, in steps 401 and 402 a core structure 100 and a faceplate 101 are obtained with each having a CTE of equal to or less than 0.5 ppm/° C. Thereafter, in step 403 the backside 101b of the faceplate 101 is bonded to the front side 100a of the core structure 100 using the adhesive I formulation. Step 404 is optional and may include a drying out of the adhesive 1 formulation after step 403 before carrying out step 405. Step 405 entails curing the adhesive I formulation disposed between the core structure and faceplate at a temperature in the range of 100 to 250° C. Thereafter, in step 406 the front side surface 101a of the faceplate 101 is optically finished to a desired prescription. According to some implementations the front side surface 101a is finished by magnetorheological finishing or ion figuring. In step 407 one or more high reflectivity layers are then deposited onto the optically finished surface.

Figure 5:
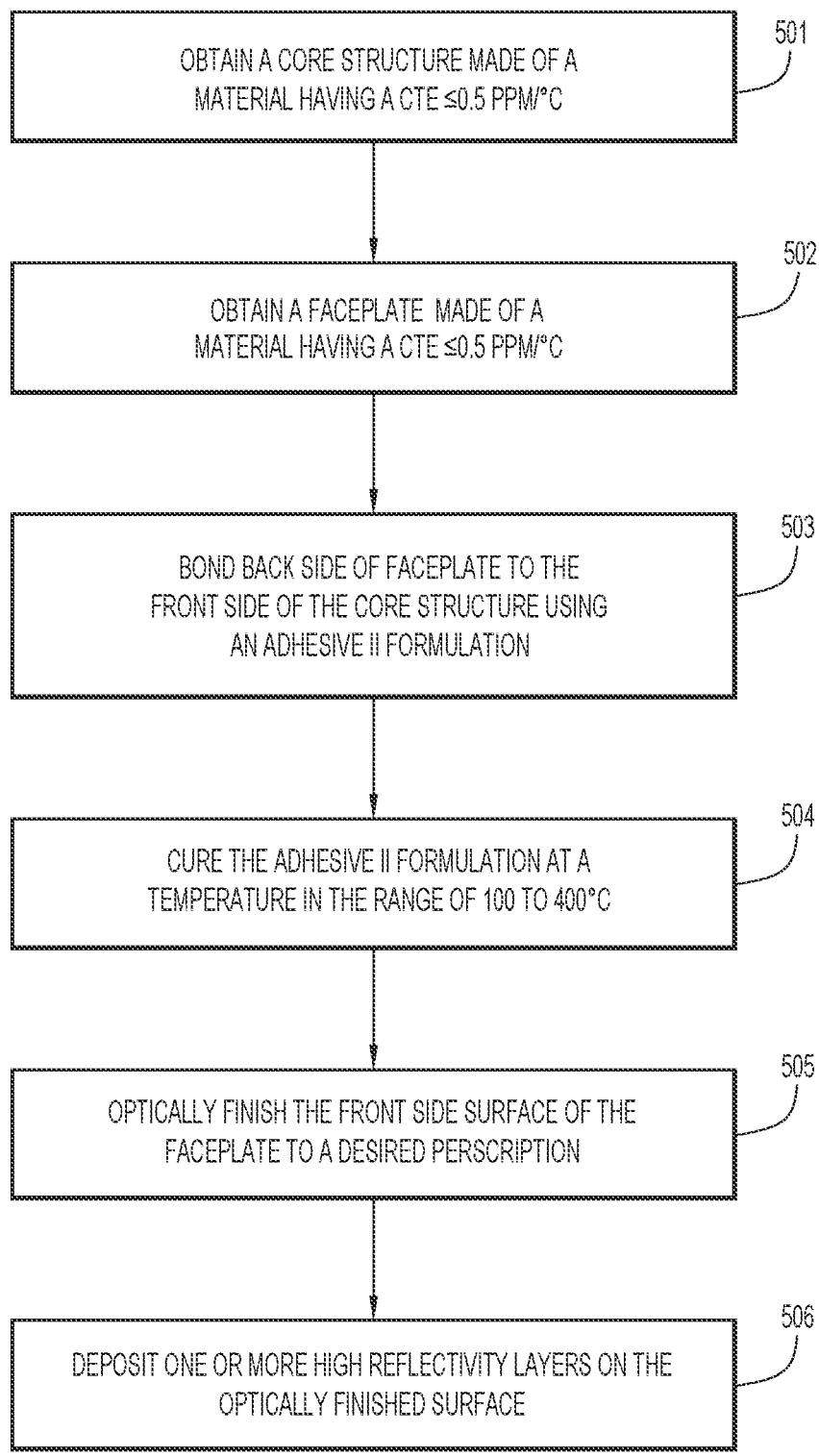
FIG. 5 is a flow chart of a method of producing a mirror according to another implementation.

In the method of FIG. 5, in steps 501 and 502 a core structure 100 and a faceplate 101 are obtained with each having a CTE of equal to or less than 0.5 ppm/° C. Thereafter, in step 503 the backside 101b of the faceplate 101 is bonded to the front side 100a of the core structure 100 using the adhesive II formulation. Step 504 entails curing the adhesive II formulation disposed between the core structure and faceplate at a temperature in the range of 100 to 400° C. Thereafter, in step 505 the front side surface 101a of the faceplate 101 is optically finished to a desired prescription. According to some implementations the front side surface 101a is finished by magnetorheological finishing or ion figuring. In step 506 one or more high reflectivity layers are then deposited onto the optically finished surface.

Figure 6:
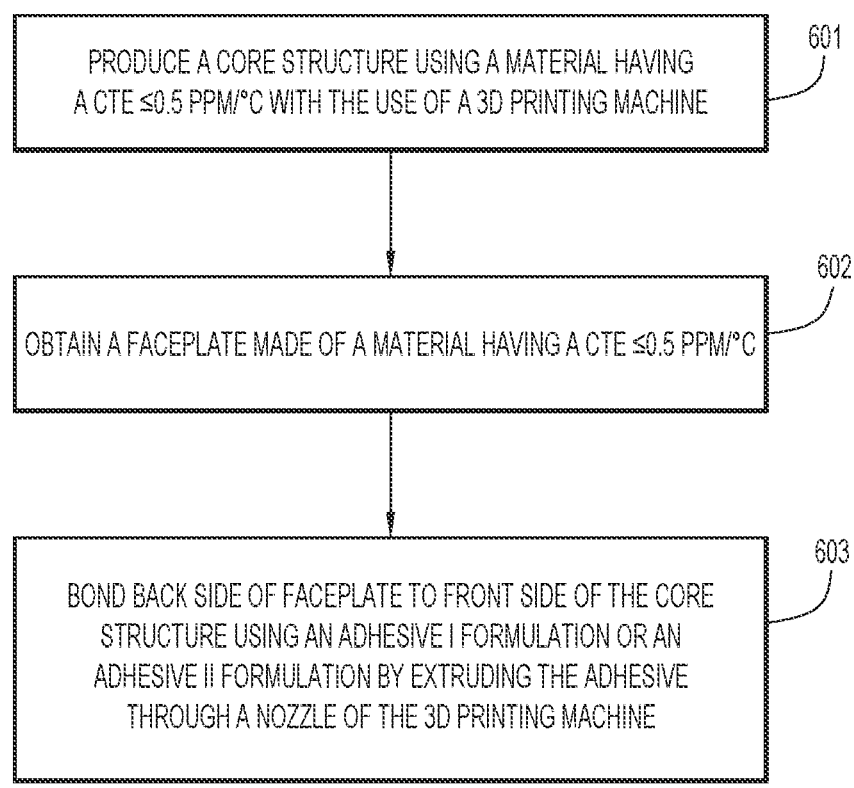
FIG. 6 is a flow chart of a method of producing a mirror according to another implementation.

In the process of FIG. 6, step 601 includes producing a core structure 100 using a material having a CTE of equal to or less than 0.5 ppm/° C. with the use of a 3D printing machine. Step 602 includes obtaining a faceplate 101 made of a material having a CTE equal to or less than 0.5 ppm/° C. Step 603 includes bonding the backside 101b of faceplate 101 to front side 100a of the core structure 100 using an adhesive I formulation or an adhesive II formulation by extruding the adhesive through a nozzle of the 3D printing machine used in step 601.

Figure 7:
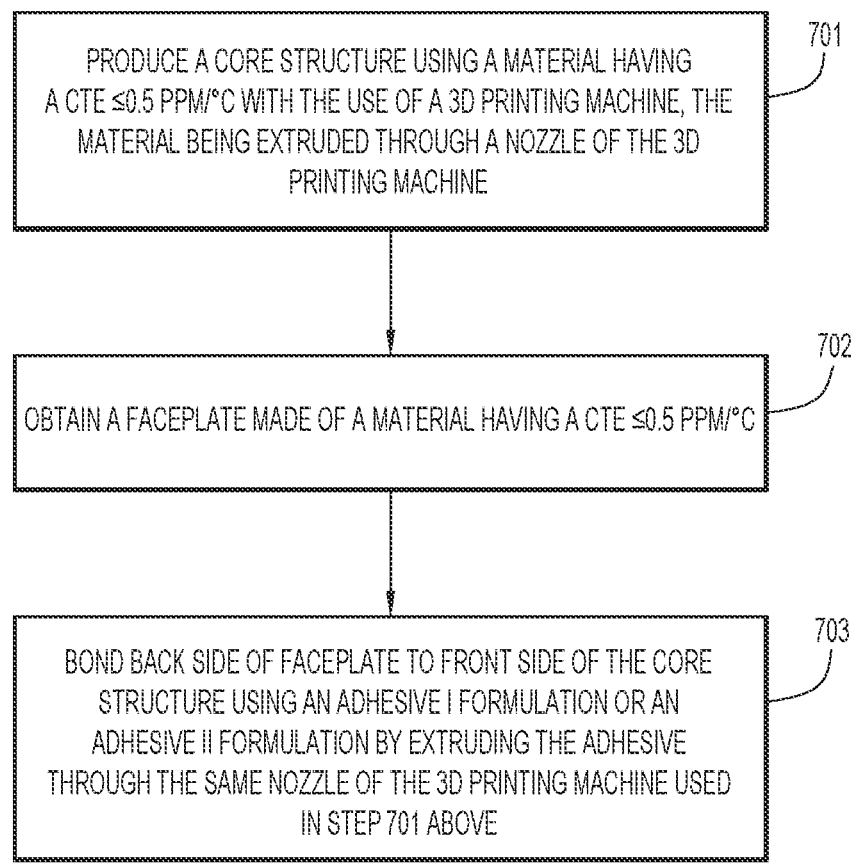
FIG. 7 is a flow chart of a method of producing a mirror according to another implementation.

In the process of FIG. 7, step 701 includes producing a core structure 100 using a material having a CTE equal to or less than 0.5 ppm/° C. with the use of a 3D printing machine with the material being extruded through a nozzle of the 3D printing machine. In step 702 a faceplate 101 made of a material having a CTE equal to or less than 0.5 ppm/° C. is obtained. In step 703, the backside 101b of faceplate 101 is bonded to the front side 100a of the core structure 100 using an adhesive I formulation or an adhesive II formulation by extruding the adhesive through the same nozzle of the 3D printing machine used in step 701.

Although only a number of examples have been disclosed herein, other alternatives, modifications, uses and/or equivalents thereof are possible. Furthermore, all possible combinations of the described examples are also covered. Thus, the scope of the present disclosure should not be limited by the particular examples disclosed herein.

What is claimed is:

1. A method of manufacturing a mirror, the method comprising:
    obtaining a core structure made of a material that has a coefficient of thermal expansion equal to or less than 0.5 ppm/° C.;
    obtaining a faceplate that is made of a material having a coefficient of thermal expansion of less than 0.5 ppm/° C.;
    bonding the faceplate to the core structure using an adhesive formulation that includes:
        fused silica particles having diameters that range between 1 to 60 micrometers, an average diameter of the silica particles being between 8 to 10 micrometers, the fused silica particles constituting 70 to 80 weight % of the adhesive formulation; and
        an activator including 25 to 50 weight % sodium silicate, 25 to 50 weight % sodium hydroxide and a liquid, the activator constituting 20 to 30 weight % of the adhesive formulation; and
    curing the adhesive formulation at a temperature in the range of 100 to 250° C.

2. The method of manufacturing a mirror according to claim 1, wherein the adhesive formulation has a coefficient of thermal expansion ranging between 0.1 to 0.3 ppm/° C.

3. The method according to claim 1, wherein the adhesive formulation is cured at a temperature in the range of 120 to 160° C.

4. The method of manufacturing a mirror according to claim 1, wherein the curing is carried out in a range of 4 to 8 hours.

5. The method of manufacturing a mirror according to claim 1, further comprising a drying out of the adhesive formulation at room temperature before the step of curing the adhesive.

6. The method of manufacturing a mirror according to claim 5, wherein the drying out is carried out for at least 0.5 hours.

7. The method of manufacturing a mirror according to claim 1, wherein the core comprises a lithium-aluminosilicate ceramic.

8. The method of manufacturing a mirror according to claim 1, wherein the core comprises a MgO, $Al_2O_3$ and $SiO_2$ composite.

9. The method of manufacturing a mirror according to claim 1, wherein the core comprises a ceramic material.

10. The method of manufacturing a mirror according to claim 1, wherein obtaining the core structure comprises manufacturing the core structure using a 3D printing machine and the bonding of the faceplate to the core structure includes extruding the adhesive through a nozzle of the 3D printing machine onto one or both of the core structure and the faceplate.

11. The method of manufacturing a mirror according to claim 1, wherein the material of which the faceplate is made is a titania silicate glass.

12. The method of manufacturing a mirror according to claim 1, further comprising bonding a back plate to a backside of the core structure using the adhesive formulation, the back plate being made of a material having a CTE of equal to or less than 0.5 ppm/° C.

13. The method of manufacturing a mirror according to claim 1, wherein the faceplate includes a back side that is bonded to a front side of the core structure, the method further comprising optically finishing a front side surface of the faceplate.

14. The method of manufacturing a mirror according to claim 13, further comprising depositing one or more light reflective layers onto the optically finished front side surface of the faceplate.

15. The method of manufacturing a mirror according to claim 1, wherein a backside of the faceplate is bonded to a front side of the core structure, the method further comprising bonding a front side of a back plate to a backside of the core structure.

16. The method of manufacturing a mirror according to claim 15, wherein the back plate is bonded to the core structure prior to bonding the faceplate to the core structure.

17. The method of manufacturing a mirror according to claim 15, wherein the back plate is made of a material having a coefficient of thermal expansion equal to or less than 0.5 ppm/° C.

18. The method of manufacturing a mirror according to claim 17, wherein each of the faceplate and back plate is made of titania silicate glass.

19. A method of manufacturing a mirror, the method comprising:
  obtaining a core structure made of a material that has a coefficient of thermal expansion equal to or less than 0.5 ppm/° C.;
  obtaining a faceplate that is made of a material having a coefficient of thermal expansion of less than 0.5 ppm/° C.;
  bonding the faceplate to the core structure using an adhesive formulation that includes:
    fused silica particles having diameters that range between 1 to 60 micrometers, an average diameter of the silica particles being between 8 to 10 micrometers, the fused silica particles constituting 70 to 80 weight % of the adhesive formulation; and
    an activator including 25 to 50 weight % sodium silicate, 25 to 50 weight % sodium hydroxide and a liquid, the activator constituting 20 to 30 weight % of the adhesive formulation; and
  curing the adhesive formulation at a temperature in the range of 100 to 250° C.;
  the bonding of the faceplate to the core structure includes extruding the adhesive formulation through a 0.026 to 0.063 inch nozzle onto one or both of the core structure and the faceplate.

20. The method of manufacturing a mirror according to claim 19, wherein the nozzle comprises a part of a 3D printing machine.

* * * * *